UNITED STATES PATENT OFFICE.

ISRAEL SCHLOSSBERG, OF HAMBURG, GERMANY.

METHOD OF PRODUCING ACID- AND FIREPROOF BODIES.

1,126,659.  Specification of Letters Patent.  Patented Jan. 26, 1915.

No Drawing.  Application filed July 15, 1913. Serial No. 779,096.

*To all whom it may concern:*

Be it known that I, ISRAEL SCHLOSSBERG, Ph. D., a subject of the Emperor of Russia, residing at Hamburg, in the Empire of Germany, have invented a novel Method of Producing Acid- and Fireproof Bodies, of which the following is a specification.

My invention relates to the manufacture of acid- and fireproof bodies consisting principally of pure silicic acid. More particularly the manufacture is intended for producing highly fireproof stones, such as are used for lining furnaces serving for carrying out metallurgical processes.

The novel process is essentially characterized in that the stones to be manufactured are given the necessary strength required for their later employment and the inner coherence of the several constituent parts without any previous burning process, and in that the burning process takes effect only during the practical use of the bodies.

As is well known the strength of all the fireproof stones at present at disposal rapidly diminishes during their practical use, so that the stones in the furnace lining require for this reason a frequent exchange. In contradistinction to the fireproof stones hitherto used, the fireproof stones manufactured according to my method will prove to be better suited for their practical use, since the temperatures acting upon the stones during their practical use cause the constituent parts to sinter, whereby the coherence is increased.

As departing material for the manufacture of such fireproof stones the quartzite is used. Suitable quantities of quartzite sand are mixed with a sufficient quantity of colloidal silicic acid under the addition of a corresponding quantity of lime in the manner, that the quartzite is intimately mixed with the required quantities of colloidal silicic acid and calcium oxid or hydroxid and from the mixture so obtained, which very rapidly obtains a sufficient coherence, stones are formed, which in a known manner are hardened by means of steam. In order to remove the percentage of lime, the stones are treated with silicofluoric acid, so that the lime combines with the acid to form silicofluorid of lime, which is soluble in water and can be separated by lixiviation. The fact, that the stones during this lixiviation become porous is an advantage of the method. Under circumstances instead of the silicofluoric also other acids, such as for example hydrochloric acid, may be used.

The fireproof stones obtained in the just described manner will very well withstand temperatures of 1800° centigrade and more and will be found to be useful for all purposes, where similarly high temperatures are employed. In case, however, stones are to be produced, which are used for temperatures of only from 800° to 1200° centigrade, the said method will require to be modified in some points. For I have made the strange discovery, that the stones produced for the employment at temperatures of 1800° centigrade and more do not sufficiently withstand lower temperatures of from 800° to 1200° centigrade, but in some cases become friable. The reason for this lies in that a temperature of 800° to 1200° centigrade does not suffice for causing the stones obtained by the above described method to sinter, so that during use they do not attain the sufficient strength.

Detailed experiments have shown that for stones intended to withstand low temperatures a certain quantity of a flux is required, which is capable of causing the constituent parts to sinter already at temperatures of 800° to 1200° centigrade, so that they attain a coherence sufficient for these temperatures and a sufficient strength. Such sintering means may be any substances which liquefy at the corresponding temperatures, for example and with a great advantage ground glass or ground bricks. In this case the method is carried on as follows: The quartzite is intimately mixed with the required quantities of colloidal silicic acid and calcium oxid or hydroxid and at the same time the necessary quantity of ground glass or ground bricks is added. From the mixture so obtained stones are formed as described above. Otherwise the method is exactly the same as before.

*Example 1.*

*For highly fireproof stones.*—8 parts of quartzite and colloidal silicic acid, 1 part of lime.

*For less fireproof stones.*—7 parts of quartzite, 1 part of ground glass, 1 part of lime.

*Example 2.*

4 parts of quartzite, 2 parts of ground bricks, 1 part of ground glass, 1 part of lime.

Herein the constituent parts quartzite and ground brick may vary with regard to one another.

I claim:

1. The herein described method of producing acid- and fireproof bodies, which consists in working quartzite with colloidal silicic acid and lime so as to form a plastic mass, forming stones from this plastic mass, hardening these stones, freeing the stones from lime by treating them with an acid capable of forming a soluble salt of calcium and by lixiviating the stones.

2. The herein described method of producing acid- and fireproof bodies, which consists in working quartzite with colloidal silicic acid and lime under the addition of a flux so as to form a plastic mass, forming stones from this plastic mass, hardening these stones, and freeing the stones from lime by treating them with an acid capable of forming a soluble salt of calcium and by lixiviating the stones.

3. The herein described method of producing acid- and fireproof bodies, which consists in working quartzite with colloidal silicic acid and lime under the addition of ground glass so as to form a plastic mass, forming stones from this plastic mass, hardening these stones, and freeing the stones from lime by treating them with an acid capable of forming a soluble salt of calcium and by lixiviating the stones.

4. The herein described method of producing acid- and fireproof bodies, which consists in working quartzite with colloidal silicic acid and lime under the addition of a ground silicate so as to form a plastic mass, forming stones from this plastic mass, hardening these stones, and freeing the stones from lime by treating them with an acid capable of forming a soluble salt of calcium and by lixiviating the stones.

5. The herein described method of producing acid- and fireproof bodies, which consists in working quartzite with colloidal silicic acid and lime under the addition of ground glass and ground bricks so as to form a plastic mass, forming stones from this plastic mass, hardening these stones, and freeing the stones from lime by treating them with an acid capable of forming a soluble salt of calcium and by lixiviating the stones.

ISRAEL SCHLOSSBERG.

Witnesses:
ERNEST H. L. MUMMENHOFF,
ANDREW W. PENTLAND.